United States Patent [19]

Doyle

[11] 4,337,318
[45] Jun. 29, 1982

[54] PROCESS FOR THE TOTAL PRE-EXPANSION OF POLYURETHANE FOAM

[76] Inventor: Earl N. Doyle, 6333 Dixie Dr., Houston, Tex. 77807

[21] Appl. No.: 192,613

[22] Filed: Sep. 30, 1980

[51] Int. Cl.$^3$ ............................................. C08G 18/14
[52] U.S. Cl. .................................... 521/80; 521/917
[58] Field of Search .................................. 521/80, 917

[56] References Cited

U.S. PATENT DOCUMENTS

| | | | |
|---|---|---|---|
| 3,184,419 | 5/1965 | Merriman | 521/917 |
| 3,220,801 | 11/1965 | Rill et al. | 521/917 |
| 3,725,318 | 4/1973 | Bengtson | 521/80 |
| 3,882,052 | 5/1975 | Raynor et al. | 521/917 |
| 4,120,923 | 10/1978 | Kloker et al. | 264/45.8 |

*Primary Examiner*—Maurice J. Welsh
*Attorney, Agent, or Firm*—Burns, Doane, Swecker & Mathis

[57] ABSTRACT

The present invention provides a method of utilizing polyurethane foam for insulation purposes in existing walls and other areas without expanding the existing structure. Conventional polyurethane foam post-expands, causing pressures as high as 6 p.s.i., which results in swelling and expanding of existing wall structures. The process of the present invention places the polyurethane foam into its final position in a totally pre-expanded form, making it possible to insulate homes, office buildings, and any other existing structure with foam having a density as low as 0.5 lb. per cu. ft. with no distortion of even the weakest type of structure.

11 Claims, No Drawings

PROCESS FOR THE TOTAL PRE-EXPANSION OF POLYURETHANE FOAM

BACKGROUND OF THE INVENTION

Polyurethane foam has been utilized for thermal insulation in buildings, storage tanks, freezers, freezer trucks and ships, railway cars, etc., for many years. To date, there have been basically three methods of applying the foam:

(a) A given thickness of the foam can be sprayed onto an existing surface. When cured, the foam can then be covered with a second surface, such a plywood, sheetrock, etc.

(b) The mixed chemicals can be poured into a cavity between two surfaces which are strong enough to withstand the post-expansion pressures. Often, the surfaces are weak surfaces, such as plywood or sheetrock. Such surfaces must be reinforced with forms, much like concrete forms, which are removed after the foam has cured.

(c) Slabs of foam can be pre-manufactured by pouring the mixed chemicals into suitable molds, usually 4 ft. × 4 ft. × 8 ft., and then sawing the cured polyurethane foam into slabs having a thickness of 1 inch up to 4 inches. The slabs can then be placed into attics, between walls, around storage tanks, etc.

Polyurethane foam is normally about 2 lbs. per cu. ft. density for insulation purposes. It is blown or foamed with water or Freon 11, which has a boiling point of 74.6° F. Occassionally, foam is "frothed", or partially frothed, with Freon 12, which has a much lower boiling point, so that the foam is at least partially expanded as it comes from the mixing nozzle. Sometimes, the two components are run through heaters and through heated hoses, so as to cause more immediate expansion of the foam. By all these methods, however, the foam is never more than about 80 percent expanded when it emerges from the mixing nozzle. The subsequent post-expansion creates pressures which will blow apart walls in normal buildings.

U.S. Pat. No. 3,184,419 discloses a method for the production of polyurethane foam material. The method comprises incorporating a soluble inert gas under pressure in the liquified state into a liquid composition containing a polymer and a compound capable of reacting therewith to form a polyurethane foam material. The inert gas is introduced into the liquid composition at a temperature below that at which substantial reaction between the polymer and the reactant compound takes place. The liquid composition is foamed by reducing the pressure of the mixer and raising the temperature of the foam to convert the composition into an elastomer. Listed among suitable inert gases are carbon dioxide and halogenated methanes, including Freon 13 and Freon 23. While the patent discloses mixing the carbon dioxide or other inert gas into the prepolymer at sufficient pressure to maintain it as a liquid, the pressure of the mixture is allowed to drop to 300 p.s.i. in the mixing chamber. At least half of the expansion of the foam occurs in the mixing chamber at this pressure. When released from the mixing chamber to atmospheric pressure, there is simply not enough pressure drop to totally expand the remainder of the mixture. Furthermore, water is present in the system, which automatically means much post-expansion since water reacts with NCO groups to produce carbon dioxide. Moreover, the patented process requires cooling the inert gas to aid in maintaining it in the liquid state, which is a very expensive procedure.

U.S. Pat. No. 4,120,923 discloses a process for the manufacture of foamed polymeric materials. A blowing agent having a boiling point under normal pressure of less than 0° C. is added to the resin in a pressure vessel under a pressure of 3 to 350 bars, at a temperature between 0° C. and 50° C. The mixture is subsequently expanded, in stages or continuously, and is cured with a curing agent. Examples of suitable blowing agents are air, carbon dioxide, helium, argon, nitrogen, volatile hydrocarbons, and volatile halogenated hydrocarbons, including Freon 13. The preferred blowing agent is carbon dioxide, since it demonstrates the greatest absorption in the case of most resins. This patent provides a very complicated process for the introduction of blowing agents. The gas is absorbed into the resin as the resin flows as a thin film over the disclosed apparatus. The patented process requires extremely complicated and expensive equipment which is totally inadequate for the rapid production of insulating foam. The patent does not disclose a process for the total pre-expansion of polyurethane foam.

U.S. Pat. No. 3,220,801 discloses apparatus for generating a polyurethane froth. The apparatus provides a mixing chamber into which are separately injected a polyisocyanate, an activator, and a volatile liquid, such as difluorodichloromethane, under pressure. The components are thoroughly mixed until the volatile liquid completely penetrates the other two components. The mixture is ejected from the apparatus through a pressure release valve and a discharge nozzle. The patented process provides neither sufficient pressure drop nor temperature to cause total expansion of the foam. At column 5, lines 54–58, it is disclosed that approximately 20 percent post-expansion occurs.

OBJECTS OF THE INVENTION

It is an object of the present invention to provide a process for the total pre-expansion of polyurethane foam.

It is also an object of the present invention to provide a process for the production, in the absence of post-expansion, of low density polyurethane foam, by which process the polyurethane foam is placed into position within a cavity, such as a wall or other enclosed space, in a totally expanded state with no further expansion.

It is also an object of the present invention to provide a process for the production in the absence of post-expansion of low density polyurethane foam which utilizes conventional equipment and conventional polyurethane foam components.

It is also an object of the present invention to provide a process for the total pre-expansion of polyurethane foam whereby a polyurethane foam reactant mixture is expanded by completely and instantaneously vaporizing a blowing agent which is maintained in the liquid state at high pressure prior to expansion.

SUMMARY

The present invention provides a process for the production of low density polyurethane foam in the absence of the post-expansion. The process comprises the steps of:

(a) mixing together in a mixing zone (i) a first component comprising polymeric diisocyanate having a functionality within the range of approximately 2.2 to 2.9, (ii) a second component comprising a blend of polyol, surfactant, and catalyst, and (iii) a blowing agent comprising a gas having a boiling point below approximately $-100°$ F. at atmospheric pressure, the mixture being subjected in the mixing zone to a pressure sufficient to maintain the blowing agent in the liquid state at ambient temperature, the mixture being substantially free of water;

(b) ejecting the mixture from the mixing zone to atmospheric pressure, thereby completely and instantaneously vaporizing the blowing agent and providing total expansion of the mixture; and (c) curing the resulting foam. Preferably, the blowing agent is carbon dioxide, and the pressure in the mixing zone is at least approximately 1000 p.s.i.

DETAILED DESCRIPTION OF THE INVENTION

The present invention relates to a process for the production of low density polyurethane foam in the absence of post-expansion. By "low density polyurethane foam" is meant a foam having a density within the range of approximately 0.5 to 6 lbs. per cu. ft.

The polyurethane foam is formed from three liquid components, namely, a first component which comprises an NCO-terminated prepolymer or a straight polymeric diisocyanate, a second component which comprises a hydrogen donor, and a third component which comprises a blowing agent. The three components are commonly provided separately to the mixing zone.

The use of a two-component system (including a foaming agent) to form a polyurethane is, of course, well-known in the art and is described in the literature, for example, in "The Development and Use of Polyurethane Products", E. N. Doyle, McGraw-Hill Book Co. (1971), cited hereafter as Doyle. While many of the constituents of the components used in the present invention are known per se, the components are formulated and used in a manner heretofore unrecognized to provide a totally pre-expanded foam.

The first component contains an NCO-terminated prepolymer or a straight polymeric diisocyanate. NCO-terminated prepolymers are known in the art (see, for example, Doyle, pp. 29-43) and comprise a mixture of a diisocyanate, such as toluene diisocyanate, with a hydrogen donor, such as polyoxypropylene glycol or a hydroxyl-terminated polybutadiene, to yield an NCO-terminated prepolymer which will react with the remainder of the hydrogen donor in the second component to form the polyurethane.

The first component is preferably a straight polymeric diisocyanate, such as polymeric 4,4'-diphenylmethane diisocyanate (MDI), having a functionality within the range of approximately 2.2 to 2.9.

The diisocyanate and hydrogen donors are conventional compounds and the choice of the particular diisocyanate and hydrogen donor may vary according to the specific properties desired in the polyurethane in a manner understood by the skilled artisan.

The second component contains the hydrogen donors necessary to react with the NCO-terminated prepolymer or polymeric diisocyanate to form the polyurethane. A single hydrogen donor or a mixture of hydrogen donors may be utilized. Again, the hydrogen donors are conventional and the choice of a particular hydrogen donor may be determined by the skilled artisan to achieve the particular properties desired. The hydrogen donors are generally one or more polyols, such as glycerine-based triols, castor oil, polyoxypropylene glycol, aliphatic amine-based polyol or piperazine-based polyol, or hydroxy-terminated polymers, such as polybutadiene. See also, Doyle, pages 44 et seq. for a listing of conventional hydrogen donors.

The second component also contains the catalyst. The catalyst can be any suitable urethane polymerization catalyst, such as, for example, tin or lead octoate or a tertiary amine catalyst (see also, Doyle, pp. 64–67) and other additives (dyes and the like). The second component also contains a surfactant, such as a silicone surfactant (for example, an organo-silicone block copolymer).

The first component and the second component are commonly provided in substantially equal volumes.

The blowing agent can be any suitable substance which is in the gaseous state at atmospheric pressure and ambient temperature and which has a boiling point below approximately $-100°$ F. The gas must also be non-toxic, non-flammable, and non-reactive with the urethane reactants. Such gases include carbon dioxide, nitrogen, helium, tetrafluoromethane (Freon 14), fluoroform (Freon 23), hexafluoroethane (Freon 116), chlorotrifluoromethane (Freon 13), and mixtures thereof, such as a mixture of fluoroform and chlorotrifluoromethane (Freon 503).

The preferred blowing agent is carbon dioxide which is very inexpensive in comparison to the other suitable blowing agents and which provides a large volume of gas per gram of liquid, thereby requiring the use of less carbon dioxide than other gases for a given density foam.

In an especially preferred embodiment, the liquid carbon dioxide is present in an amount within the range of approximately 10 to 25 percent by volume, based upon the total volume of the first component, the second component, and the blowing agent.

According to the process of the present invention, the first component, the second component, and the blowing agent are mixed together in a mixing zone. The individual components are provided to the mixing zone in the liquid state, and the mixture is subjected in the mixing zone to a pressure sufficient to maintain the blowing agent in the liquid state at ambient temperature. Commonly, the pressure in the mixing zone is above 1000 p.s.i. Preferably, the pressure in the mixing zone is approximately 2000 to 3000 p.s.i.

After the components have been mixed in the mixing zone, the mixture is then ejected from the mixing zone to atmospheric pressure so as to completely and instantaneously vaporize the blowing agent and provide total expansion of the mixture. The large pressure drop from the mixing zone, where the carbon dioxide or other blowing agent is maintained in the liquid state, to atmospheric pressure causes the complete and instantaneous vaporization of the carbon dioxide or other blowing agent. It is this complete and instantaneous vaporization which prevents post-expansion of the polyurethane foam by totally and completely expanding the mixture at the time of the pressure drop.

Following expansion, the resulting foam is then cured in the totally expanded state. There is, therefore, no further expansion within a cavity, such as between walls or in any other enclosed space into which the polyurethane foam may have entered or been placed. Thus, no pressures are created within such spaces.

As a further safeguard against post-expansion, the reaction mixture must be substantially free of water.

Water reacts with available NCO groups to produce carbon dioxide. The release of this carbon dioxide after the polyurethane mixture has been ejected from the mixing zone and cured would lead to post-expansion of the foam. Therefore, according to the process of the present invention, the reaction mixture is essentially free of water.

It is contemplated that the process of the present invention be conducted at ambient temperatures; that is, no heating or cooling of the various components or of the reaction mixture is required. It is possible to work at ambient temperatures within the range of approximately 50° F. to 100° F. and still have totally expanded foam, simply by adjusting the size of the orifice through which the reaction mixture is ejected from the mixing zone. The orifice size is adjusted to get lower pressures at higher temperatures and higher pressures at lower temperatures. For example, at a temperature of 100° F., a larger nozzle would be used, the pressure would be approximately 1000 to 1100 p.s.i., and the foam could be pumped at a relatively high rate; at lower temperatures, due to the higher pressures required, a smaller nozzle would be used, and the foam would be pumped at a relatively low rate, with correspondingly higher pressures.

The apparatus contemplated for use in the process of the present invention is conventional two-component, one-to-one proportioning equipment, with a third pump added, utilizing scissors to provide adjustment in the percentage of blowing agent provided to the mixing zone. The third pump can be, for example, a 30:1 pump which will provide pressures up to 3000 p.s.i., according to the orifice size in the outlet nozzle. The third pump is commonly air-operated, so that 100 p.s.i. air pressure to the air motor provides 3000 p.s.i. coming from the hydraulic pumps. The basic two-component, one-to-one proportioning equipment is depicted and described in U.S. patent application Ser. No. 857,697, filed Dec. 5, 1977, entitled "Safety Tires, Methods and Equipment Therefor", now U.S. Pat. No. 4,248,811 which is incorporated herein by reference. However, rather than mixing the blowing agent with the second component prior to introduction into the mixing zone, as disclosed therein, the apparatus which is preferred for use in the process of the present invention provides a third pump for the separate introduction of the blowing agent into the mixing zone.

SUMMARY OF ADVANTAGES

The present invention provides a process for the production of low density polyurethane foam in the absence of post-expansion. In houses, in particular, the inner walls are commonly either sheetrock or plywood paneling. Simply no post-expansion can be tolerated. With conventional systems, which post-expand even 10 percent (and none are known that expand this small amount), the foam would bulge tremendously the inner walls of homes, or blow them out entirely. According to the process of the present invention, the operator simply fills the cavity and cuts off the nozzle, all of the expansion occurring at the nozzle as the mixture is ejected from the mixing zone to atmospheric pressure. No post-expansion occurs to create internal pressures.

In attics, where post-expansion is far less a problem, the operator simply lays down a two inch to four inch layer evenly. Conventional systems utilizing a post-expanding foam do not provide even layers of insulation.

In some areas of buildings, it may be necessary for people to walk on the foam after it has cured. In this case, the operator simply adjusts the carbon dioxide pump to give a lesser percentage of carbon dioxide in the mixture, thereby providing foam of higher density which is capable of withstanding being walked upon.

With the energy crisis, thermal insulation is of great importance. There is a serious shortage of fiberglass and mineral wool insulation materials. These must be used at roughly three times the thickness of the foam produced in accordance with the process of the present invention in order to have the same insulation value. The low density foam produced in accordance with the process of the present invention is as cheap as, or cheaper that, fiberglass or mineral wool. So-called cellulosic insulation and urea foams have been cut back and are likely to be cut off completely due to tremendous inadequacies and hazards.

The principles, preferred embodiments, and modes of operation of the present invention have been described in the foregoing specification. The invention which is intended to be protected herein, however, is not to be construed as limited to the particular forms disclosed, since there are to be regarded as illustrative rather than restrictive. Variations and modifications may be made by those skilled in the art without departing from the spirit of the invention.

I claim:

1. A process for the production of low density polyurethane foam in the absence of post-expansion, said process comprising the steps of:
    (a) mixing together in a mixing zone at ambient temperature (i) a first component comprising polymeric diisocyanate having a functionality within the range of approximately 2.2 to 2.9, (ii) a second component comprising a blend of polyol, surfactant, and catalyst, and (iii) a blowing agent comprising a gas having a boiling point below approximately $-100°$ F. at atmospheric pressure, the mixture being subjected in said mixing zone to a pressure sufficient to maintain said blowing agent in the liquid state at ambient temperature, said mixture being substantially free of water;
    (b) ejecting said mixture from said mixing zone to atmospheric pressure, thereby completely and instantaneously vaporizing said blowing agent and providing total expansion of said mixture, and
    (c) curing the resulting foam.

2. The process of claim 1 wherein said blowing agent is selected from the group consisting of carbon dioxide, nitrogen, helium, tetrafluoroethane, fluoroform, hexafluoroethane, chlorotrifluoromethane, and mixtures thereof.

3. The process of claim 2 wherein said blowing agent is carbon dioxide.

4. The process of claim 1 wherein said mixture is subjected in said mixing zone to a pressure of at least approximately 1000 p.s.i.

5. The process of claim 1 wherein said polyurethane form has a density within the range of approximately 0.5 to 6 lbs. per cu. ft.

6. The process of claim 1 wherein said first component and said second component are provided in substantially equal volumes.

7. A process for the production of low density polyurethane foam in the absence of post-expansion, said process comprising the steps of:

(a) mixing together in a mixing zone at ambient temperature (i) a first component comprising polymeric diisocyanate having a functionality within the range of approximately 2.2 to 2.9, (ii) a second component comprising a blend of polyol, surfactant, and catalyst, and (iii) carbon dioxide, the mixture being subjected in said mixing zone to a pressure of at least approximately 1000 p.s.i. in order to maintain said carbon dioxide in the liquid state at ambient temperature, said mixture being substantially free of water;

(b) ejecting said mixture from said mixing zone to atmospheric pressure, thereby completely and instantaneously vaporizing said carbon dioxide and providing total expansion of said mixture; and (c) curing the resulting foam.

8. The process of claim 7 wherein said polyurethane foam has a density within the range of approximately 0.5 to 6 lbs. per cu. ft.

9. The process of claim 7 wherein said mixture comprises substantially equal volumes of said first component and said second component.

10. The process of claim 7 wherein said mixture in said mixing zone comprises approximately 10 to 25 percent by volume of said carbon dioxide in the liquid state.

11. A process for the production, in the absence of post-expansion, of polyurethane foam having a density within the range of approximately 0.5 to 6 lbs. per cu. ft., said process comprising the steps of:

(a) mixing together in a mixing zone at ambient temperature (i) a first component comprising polymeric diisocyanate having a functionality within the range of approximately 2.2 to 2.9, (ii) a second component comprising a blend of polyol, surfactant, and catalyst, and (iii) carbon dioxide, the mixture being subjected in said mixing zone to a pressure of at least approximately 1000 p.s.i. in order to maintain said carbon dioxide in the liquid state at ambient temperature, said mixture comprising substantially equal volumes of said first component and said second component, said mixture further comprising approximately 10 to 25 percent by volume of said carbon dioxide in the liquid state, and said mixture being substantially free of water;

(b) ejecting said mixture from said mixing zone to atmospheric pressure, thereby completely and instantaneously vaporizing said blowing agent and providing total expansion of said mixture; and (c) curing the resulting foam.

* * * * *